United States Patent [19]

Altes

[11] 4,042,928
[45] Aug. 16, 1977

[54] TECHNIQUE OF CHARACTERIZING THE NATURE OF A RADIATION PATH TRANSFER FUNCTION BY A FEW CONSTANTS

[75] Inventor: Richard A. Altes, Palo Alto, Calif.

[73] Assignee: ESL Incorporated, Sunnyvale, Calif.

[21] Appl. No.: 672,315

[22] Filed: Mar. 31, 1976

Related U.S. Application Data

[63] Continuation-in-part of Ser. No. 453,799, March 22, 1974, abandoned.

[51] Int. Cl.² ............................ G01S 9/02; G01S 9/66
[52] U.S. Cl. ................................ 343/5 SA; 340/3 M;
340/15.5 TA; 343/100 CL
[58] Field of Search ............... 340/15.5 TA, 15.5 CC,
340/3 M; 343/100 CL, 5 SA

[56] References Cited

U.S. PATENT DOCUMENTS

| 3,398,269 | 8/1968 | Williams | 343/100 CL X |
|---|---|---|---|
| 3,483,557 | 12/1969 | Skenderoff et al. | 343/9 |
| 3,610,901 | 10/1971 | Lynch | 343/5 DP X |
| 3,618,095 | 11/1971 | Darlington | 343/17.2 PC |
| 3,716,823 | 2/1973 | Thompson et al. | 343/5 SA X |
| 3,787,849 | 1/1974 | Sletten et al. | 343/100 CL X |
| 3,803,598 | 4/1974 | Abernathy et al. | 340/3 M |
| 3,803,606 | 4/1974 | Lebail et al. | 340/5 H X |
| 3,925,653 | 12/1975 | Otto | 343/100 CL X |

*Primary Examiner*—Malcolm F. Hubler
*Attorney, Agent, or Firm*—Limbach, Limbach & Sutton

[57] ABSTRACT

A specially generated broad band radiation signal is passed through a radiation path. The output radiation as modified by that path is compared with the transmitted radiation in a manner to characterize in the frequency domain the radiation path transfer function or the modified radiation by a few constants of a Taylor series expansion. One application of this technique is in sonar or radar work for characterizing the shape of an object in a manner independent of its velocity but with a high signal-to-noise ratio and very good resolution. The comparison of the modified radiation with the transmitted radiation in order to determine the Taylor series coefficients is accomplished by a correlation or matched filtering operation. The technique in its broadest sense also has applications for compensating communication circuits and in parameterizing human speech.

9 Claims, 16 Drawing Figures

TECHNIQUE OF CHARACTERIZING THE NATURE OF A RADIATION PATH TRANSFER FUNCTION BY A FEW CONSTANTS

REFERENCE TO RELATED APPLICATIONS

This is a continuation-in-part of copending application Ser. No. 453,799, filed Mar. 22, 1974, now abandoned.

BACKGROUND OF THE INVENTION

This invention relates primarily to the art of measuring a radiation transfer function of radiation paths which are characterizable as linear filters.

Presently utilized radar and sonar techniques for identifying and discriminating between different objects are incapable of providing good information as to the shape of the objects irradiated. The usual technique is to generate a radiation signal and direct that signal at an object with radiation reflected by the object being used to determine its range and velocity. The bandwidth of the radiation chosen is that with which the object reacts favorably as a reflector. The range and velocity information as to each object in an object space is then used to locate and identify the various objects. The transmitted signal used in these standard techniques is either an impulse, sinewave or some form of noise. In any of these specific techniques, the filtering effects of objects being irradiated are ignored and in fact are undesirable. There has been an attempt to characterize the shape of an object by examining the rise time of pulses reflected therefrom but this technique suffers from a very low signal-to-noise ratio.

Therefore, it is a primary object of the present invention to provide an improved technique for determining shape and other information of an object from the nature of the radiation returned therefrom.

It is a further object of the present invention to provide such a technique having a high signal-to-noise ratio, high resolution and at the same time being Doppler insensitive.

It is a more general object of the present invention to provide a technique for characterizing the nature of a radiation path transfer function by only a few parameters.

SUMMARY OF THE INVENTION

Briefly, a broad band transmitted radiation function mathematically denoted as $U(\omega)$ in the frequency domain, is chosen so that when multiplied by $\omega^n$, where $n$ is an integer, the resulting function $\omega^n \cdot U(\omega)$ is a scaled version of the transmitted radiation function $U(\omega)$ and for each value of $n$ is decorrelated with the function $\omega^n \cdot U(\omega)$ for other values of $n$. A radiation path that can be treated as a linear filter modifies the transmitted signal, and the resulting changes in the signal may be characterized by a few coefficients of a mathematical Taylor series expansion when such a particular radiation function is initially transmitted.

The energy of the modified radiation in each echo component $\omega^n \cdot U(\omega)$ for a number of different integer values of $n$ sufficient to characterize the modified radiation gives the coefficients of the corresponding number of terms of a Taylor series expansion which describes the modified radiation or the radiation path transfer function in the frequency domain. The energy present in each such echo component is determined by correlation with the transmitted signal or filtering matched to the transmitted signal. A great deal of information of the radiation path or of the radiation modified thereby is thus conveyed by a few numbers.

The techniques of the present invention involve a recognition of an optimum transmitted broad band signal which permits determination of Taylor series coefficients in a radiation receiver by correlation or matched filtering techniques. This process is believed to be somewhat similar to that of animal sonar wherein certain animals such as dolphins and bats characterize physical objects in a radiation path.

A principal application of these general techniques are in the fields of sonar and radar wherein the radiation path includes a physical object to be characterized and identified. The coefficients of the Taylor series expression for the transfer function of the object convey information as to its shape, its internal structure and the magnitude and rapidity of impedance changes at its boundaries. Objects are thus discriminated and identified by their unique transfer function coefficients rather than by merely identifying the plurality of objects in a radiation field by their range and velocity as is currently practiced with the sonar and radar techniques. The techniques of the present invention have the advantage that the resolution of the object information increases as the bandwidth of the incident radiation increases. Also, these techniques have high signal-to-noise ratio which increases as the energy of the incident radiation increases, without sensitivity to the velocity of the objects being observed.

The techniques of the present invention are useful with a wide variety of frequency ranges and types of transmitted radiation. One of the types of radiation is "compressional wave energy," by which is meant acoustic energy and ultrasonic radiation. Another broad class of radiation is "electromagnetic" radiation which includes the microwave portion of the spectrum, the radar portion, light, etc. A primary requirement of the radiation with which the techniques of the present invention may be utilized is that it be somewhat controllable as to direction of propagation and be capable of generation over a broad bandwidth of frequencies. The "radiation path" which may be characterized by the techniques of the present invention may include, in other applications thereof in addition to sonar and radar work, a communications line or other electronic circuit in which the "radiation" is in the form of electrical signals. Another application of the broad techniques of the present invention is in low bandwidth information transmission wherein the Taylor series constants are transmitted (rather than transmitting the modified radiation itself). The radiation path with which the techniques of the present invention are primarily utilized should be characterizable as a "linear filter", the broad definition of which is a system which transforms a signal and has the property of linear super-position of signals passing therethrough.

Additional objects, advantages, features and applications of the present invention will become apparent from the following description of its preferred embodiments which should be taken in conjunction with the accopanying drawings.

DESCRIPTION OF THE PREFERRED EMBODIMENTS

Figure 1:
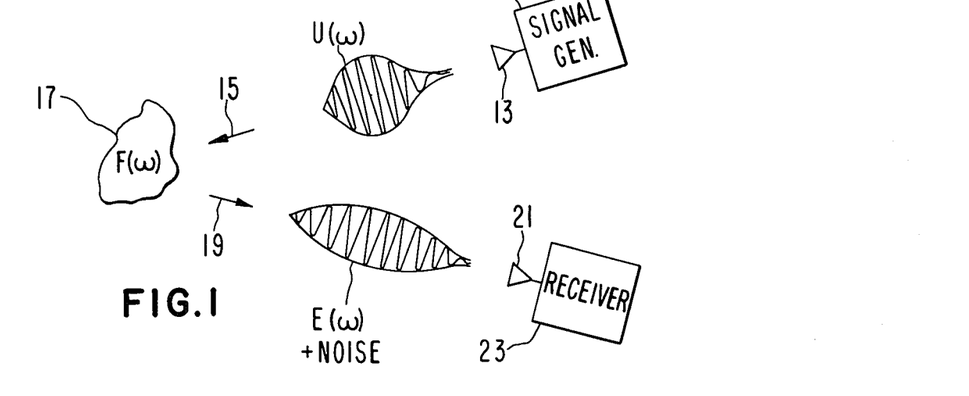
FIG. 1 illustrates use of the techniques of the present invention in a sonar or radar application.

A general utilization of the techniques of the present invention is illustrated in FIG. 1 wherein an electronic signal generator 11 drives a transducer 13 which emits radiation $U(\omega)$ and directs it in a path 15 through a transmitting media against an object 17. Object modified radiation is reflected from the object 17 in a path 19 to a receiving transducer 21 which converts the radiation into electronic signals which are then processed by a receiver 23. The transmitted signal, denoted as $U(\omega)$ in the frequency domain, is illustrated in the time domain $[u(t)]$ in FIG. 2 and is explained in detail hereinafter. This incident radiation is modified by the transfer function $F(\omega)$ of the object 17 into a modified function $E(\omega)$ plus noise. The modified radiation $E(\omega)$ differs from the transmitted radiation $U(\omega)$ primarily in a different shaped envelope. The incident radiation has been modified by the shape, orientation with respect to the incident radiation path 15, impedance characteristics at the surface of the object 17, etc. The waveform $E(\omega)$ therefore contains information as to these characteristics of the object 17 which go to make up the transfer function $F(\omega)$.

The system illustrated generally in FIG. 1 is appropriate for radar or ultrasonic applications. In the case of radar, the transmitted radiation waveform $U(\omega)$ will propagate through air or free space and will extend over a broad bandwidth of the radar range of the electromagnetic energy spectrum. In the case of ultrasonic applications, the incident radiation $U(\omega)$ will be compressional wave energy in the ultrasonic range and can be propagated through air or water. Especially in the ultrasonic applications, the radiation can be transmitted through an object rather than being reflected therefrom in order to determine different information of the object according to the techniques of the present invention.

Treating the object 17 of FIG. 1 as a linear filter, the object modified radiation may be expressed as follows in accordance with standard linear filter theory:

$$E(\omega) = U(\omega) \cdot F(\omega) \quad (1)$$

A Taylor series expansion of the object (radiation path) transfer function is expressed as follows:

$$F(\omega) = f_0 + f_1 \omega + f_2 \omega^2 + f_3 \omega^3 + \ldots f_N \omega^N \quad (2)$$

Where $f_0, f_1$, etc. are the Taylor series coefficients. It has been found as part of the present invention that these coefficients may be obtained for a given radiation path or object transfer function $F(\omega)$ by proper correlation or matched filtering within the receiver 23 when the transmitter spectrum $U(\omega)$ satisfies the following relationship:

$$\omega^n U(\omega) = C_n \cdot U(\omega/K^n) \quad (3)$$

where $C$ and $K$ are constants and $n$ is an integer.

Figure 2:
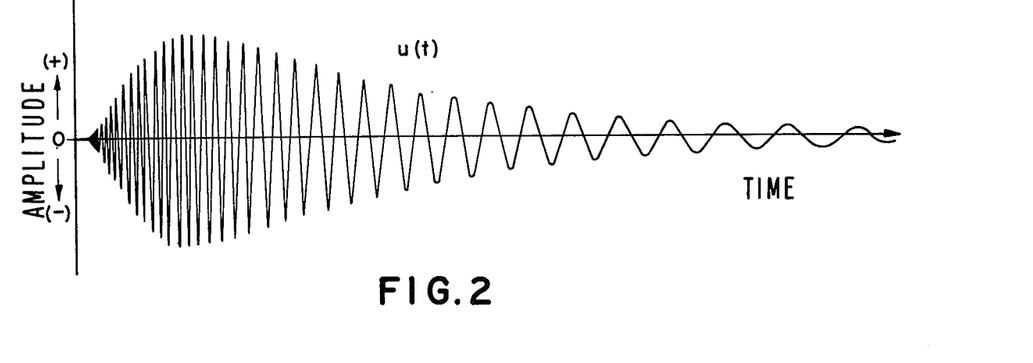
FIG. 2 shows in detail an example of a time varying waveform $u(t)$, the Fourier transform of the transmitted signal spectrum $U(\omega)$ of FIG. 1.
Figure 3:
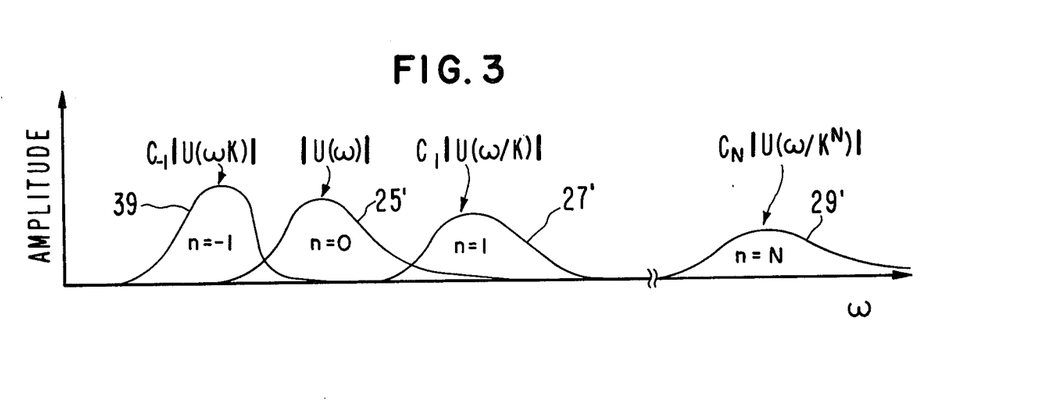
FIG. 3 illustrates in the frequency domain the desired bandpass characteristics of filters within the receiver of FIG. 1.
Figure 4:
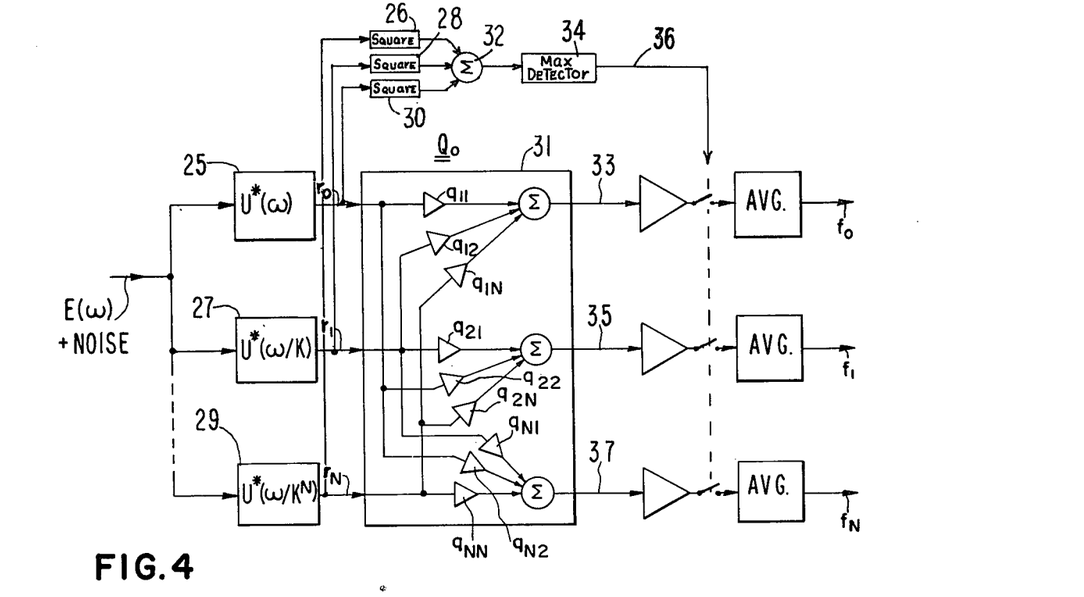
FIG. 4 shows in block diagram form a circuit technique for the receiver of FIG. 1.

Referring to FIGS. 3 and 4, basic operation of the receiver 23 of FIG. 1 is outlined for a transmitted waveform $U(\omega)$ that satisfied the expression of equation (3) above. The object modified radiation $E(\omega)$ is applied simultaneously to a bank of bandpass filters, including filters 25, 27 and 29 (FIG. 4), having transfer functions that are conjugates of the function on the right side of equation (3) for various values of $n$. The filter characteristics in terms of the transmitted waveform $U(\omega)$ of equation (3) above are shown in FIG. 3, the curve 25' being the transfer function magnitude for the filter 25, the curve 27' for the filter 27, etc. One such filter is required for each of the Taylor series coefficients of FIG. 2 that is desired to be determined. The number of coefficients required and thus the number of filters required is dependent upon the nature of the object 17 under examination and in what detail the object is desired to be examined. The object shape and other information is given primarily by the lower ordered coefficients ($f_0, f_1$, and $f_2$) of equation (2) above while determination of the higher ordered Taylor series coefficients provides a diminishing amount of information concerning the object. The individual outputs $r_0, r_1 \ldots f_N$ of the filters 25, 27 and 29, when averaged, represent the energy of $E(\omega)$ in the corresponding echo components. These outputs pass through a $Q_0$ transformation circuit 31 as known in matched filtering techniques with corresponding outputs 33, 35 and 37. The signals on each of the lines 33, 35 and 37 are passed through individual buffer amplifiers and averaging circuits to result in respective signal level outputs $f_0, f_1 \ldots f_N$, as shown in FIG. 4, which are the Taylor series coefficients of the transfer function for the object 17. It is these coefficients whch are indicative of the object shape and other factors which affect the object's modification of the incident radiation which it reflects back to the receiver.

Referring to FIG. 3, the filter characteristic bandpass curve 25' also corresponds to the frequency distribution of either side of equation (3) above for $n = 0$. For $n = 1$ in equation (3), each side of the equation has a distribution shown by the curve 27'. For $n = 2, 3 \ldots N$, the distribution curves occur at higher frequencies $\omega$ of the display of FIG. 3. Because the transmitted signal $U(\omega)$ is made to satisfy equation (3) above in a manner discussed in more detail hereinafter, the filter transfer functions of FIG. 4 as illustrated in FIG. 3 are substantially decorrelated from one another; that is, the overlap is very small between them. If $U(\omega)$ is chosen in a specific manner described hereinafter, this area of overlap of the bandpasses of the filters is very small and the functions $r_0, r_1 \ldots r_N$ conform substantially to $f_0, f_1 \ldots f_N$. However, this overlap of functions as shown in FIG. 3 may be compensated by the $Q_0$ transformation circuit 31. The circuit 31 provides a linear combination of the filter outputs with controlled weights to form the signals in the output lines 33, 35 ... 37. For example, with respect to FIG. 4, output 33 of the $Q_0$ transformation circuit 31 is formed from signals $r_0, r_1 \ldots r_N$ through respective fractional amplifier gains $q_{11}, q_{12} \ldots q_{1N}$. The amplification values may be expressed in matrix form by the following expression:

$$Q_0 = \begin{bmatrix} q_{11} & q_{12} & \cdots & q_{1N} \\ q_{21} & q_{22} & \cdots & q_{2N} \\ \vdots & & \ddots & \\ q_{N1} & q_{N2} & \cdots & q_{NN} \end{bmatrix} = \tag{4}$$

$$\begin{bmatrix} K^0 & K^{-\frac{1}{4}} & K^{-\ldots} & \cdots & K^{\frac{-N^2}{4}} \\ K^{-\frac{1}{4}} & K^0 & K^{-\frac{1}{4}} & \cdots & K^{\frac{-(N-1)^2}{4}} \\ K^{-1} & K^{-\frac{1}{4}} & K^0 & & \\ \vdots & & & \ddots & \\ K^{\frac{-N}{4}} & & & & K^0 \end{bmatrix}$$

Only values of $n$ from 0 to some desired maximum N in a positive direction have been considered. However, the system is also capable of characterizing coefficients of $\omega$ to negative powers, i.e., Laurent coefficients. Although perhaps unnecessary in most cases for describing an object transfer function, these coefficients may be determined if desired. The functions described by equation (3) for $n = -1$ are exemplified by the corresponding spectrum (curve 39) shown in FIG. 3. The curve 39 shows a typical transfer function for a filter which could be added to FIG. 4 if desired. Additional filters with transfer functions corresponding to $n = -2, -3 \ldots -N$ may be included as well if desired.

Figure 5:
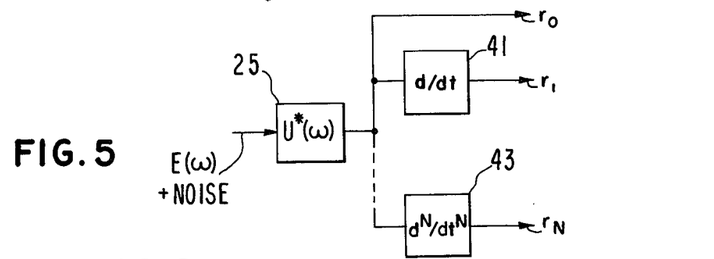
FIG. 5 shows a variation of the receiver of FIG. 1.

Each of the filters 25, 27 and 29 of FIG. 4 may be implemented by electronic hardward techniques, such as by use of a dispersive delay line, or the entire processor may be done digitally on a general purpose computer. An alternate implementation of a portion of FIG. 4 circuit is shown in FIG. 5 wherein only the bandpass filter 25 is utilized with standard differentiating circuits 41 and 43 receiving the output of that filter by an output $r_1 \ldots r_N$.

The output constants $f_0, f_1$ and $f_N$, may be determined for each object in an object field by determining these constants at a given instant when an object modified radiation pulse is received and detected. Such sampling control circuitry is illustrated in FIG. 4 wherein each of the outputs of the filters 25, 27 and 29 are squared by their individual respective squaring circuits 26, 28 and 30. The outputs of the squaring circuits are summed by a summing circuit 32 whose output is applied to a maximum detector 34. A pulse appears at an output line 36 at an instant in time when the output of the summation circuit 32 is a maximum. The pulse in the line 36 is used to close the respective switches shown in the lines 33, 35 and 37 to read out the desired constants $f_0, f_1$ and $f_N$.

The sampling circuitry of FIG. 4 functions to sample when the energy received from an object modified radiation pulse reaches a maximum. This is the optimum time to sample in such a situation. For a given object field illumination there will be several returned object modifed bursts or pulses and thus the switches in the lines 33, 35 and 37 will be instantaneously closed at several different times to read out the constants $f_0, f_1$ and $f_N$ which are characteristic of the object which is responsible for reflecting the particular pulse at the instant the switches are closed.

The implementation of the sampling circuitry of FIG. 4 is straight forward. The squaring circuits 26, 28 and 30 are commercially available as is the summation circuit 32. A maximum detector 34 is also commercially available as a unit or may be constructed from a differentiating circuit and zero crossing detector in series as one input to an AND gate with a pulse peak slicer applying its output to a second input of an AND gate. The inputs to both of these paths is the output of the summation circuit 32. The switches in the lines 33, 35 and 37 are most practically semi-conductor devices such as field effect transistors.

The characteristics of the generated incident radiation function $U(\omega)$ will now be considered. The time domain representation $u(t)$ of such a function is given in FIG. 2 and the frequency domain representation $U(\omega)$ of such a function is given by the curve 25' in FIG. 3. From the curve 25' can be seen that a $U(\omega)$ of the type discussed herein is very broad bandwidth and in fact extends at low amplitudes over very large frequency ranges that do not even appear apparent from the illustration of FIG. 3. It is the object that accentuates the amplitude of the transmitted signal $U(\omega)$ in these regions and thus gives rise to the frequencies which pass through the filters for values of $n$ other than 0. It turns out that the ratio of the bandwidth to the center frequency of each of the bandpass characteristics of each one of the filters of the receiver of FIG. 4 is the same, whereby filter bank is constant Q and permits determination of the resultant coefficients $f_0, f_1 \ldots f_n$ independent of the velocity of the object 17. As the object 17 moves, the changes (doppler shifts) imparted to the frequencies within ech component of the modified radiation signal $E(\omega)$ are not sufficient to shift the energy from one receiving filter to another because the increased filter bandwidths at higher frequencies compensate for increased doppler shifts at higher frequencies for a given object velocity. The effect upon $E(\omega)$ by object motion is negligible compared to the effect of object shape at ultrasonic and radar frequencies.

When equation (3) is solved for the desired transmitted radiation signal $U(\omega)$, the following expression results:

$$U(\omega) = \omega^\nu \cdot e^{\frac{-(\log \omega)^2}{2\log K}} \cdot G\left(\frac{\log \omega}{\log K}\right) \tag{5}$$

where $\omega^\nu$ is a proportionality factor and G (log $\omega$/log K) is any function such that G(X+A) equals G(X), where A is an integer. Since $\nu$ is most often equal to 0 and the function G (log $\omega$/log K) can be simplified, equation (5) may be rewritten as:

$$U(\omega) = e^{\frac{-(\log \omega)^2}{\log K}} \cdot e^{\frac{-2\pi m \log \omega}{\log K}} \tag{6}$$

wherein $m$ is a constant whose value controls the chirp rate of $U(\omega)$.

Choosing the K and m parameters for equation (6) will now be discussed. A preferred range for most applications of the parameter K is from 1.5 to 10.0. Factor K affects the correlation between the various terms of the echo within the bandwidths illustrated in FIG. 3. That is, the overlap of the bandpass characteristic curves in FIG. 3 becomes less as K goes up. It is for the higher values of K, in the region of 10.0, that this overlap is sufficiently small that the values $r_0, r_1 \ldots r_N$ at the outputs of the filters of FIG. 4 are substantially equal to $f_0, f_1 \ldots f_N$, the desired coefficients to be determined.

Figure 6:
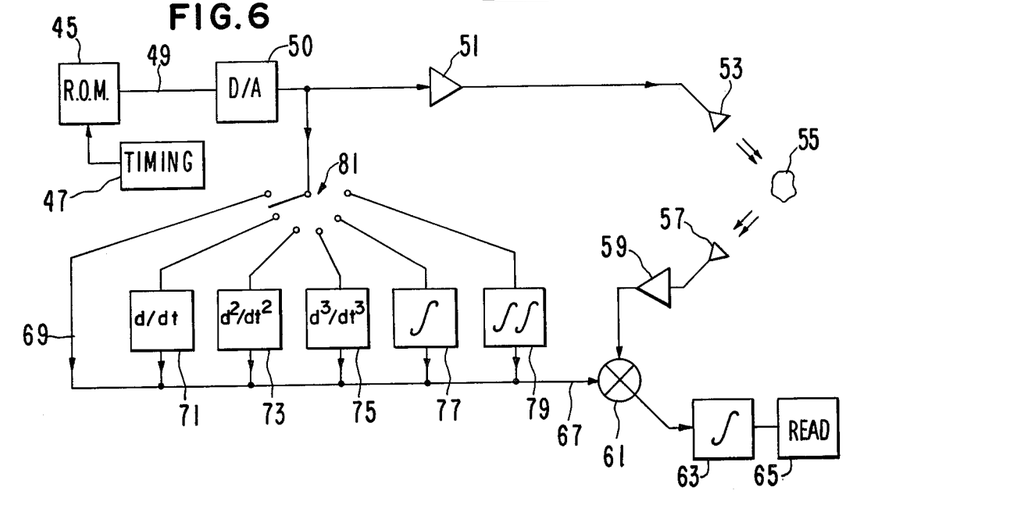
FIG. 6 illustrates a specific transmission and receiving system for carrying out the techniques of the present invention to characterize the shapes of physical objects.

The m parameters of FIG. 6 has a preferred range of from 1.0 to 100. This factor controls the rate of change in time of frequency of the signal $u(t)$ as illustrated in FIG. 2, this frequency changing at a slower rate as m goes up. The signal of FIG. 2 is an example where m = 8. If m = 2, for instance, there would be far fewer zero crossings of the waveform as shown in FIG. 2. For a certain desired signal-to-noise ratio, the power required of the transmitted pulse goes down as m goes up.

Once the parameters K and m of equation (6) have been selected, the time varying signal $u(t)$ which is directed against the object 17 under investigation is set by taking the real part of the inverse Fourier transform of $U(\omega)$. This $u(t)$ is preferably generated digitally wherein the time varying values of $u(t)$ are set into a read only memory 45 (ROM) as illustrated in a specific embodiment of FIG. 6. The ROM is then driven by an appropriate clock from a timing circuit 47 (FIG. 6) to deliver a sequence of binary numbers in its output line 49 which describe the function $u(t)$. This digital signal is converted to an analog one by a D/A converter which is then amplified by a power amplifier 51. The amplifier analog signal drives a transducer 53 which develops the radiation that illuminates an object 55. Variation of the ROM driving clock source frequency stretches or compresses the transmitted waveform $u(t)$, effectively varying $v$ of equation (5).

The inverse Fourier transform of $U(\omega)$ to obtain $u(t)$ may be done digitally on a general purpose computer by application of a FFT subroutine in Fortran computer language that has been developed and is published by IBM. The subroutine used in this particular application is Fotran IV language is reproduced below:

```
0001        SUBROUTINE RFFT (A, NPTS, M,,INV)
0002    C   A(I) IS THE FUNCTION TO BE
            FOURIER TRANSFORMED
0003    C   NPTS = DIMENSION OF A(I) = 2**M
0004    C   IF INV = 0, RFFT TAKES THE DFT OF A.
0005    C   IF INV = 1, RFFT TAKES THE INVERSE
            DFT OF A.
0006        COMPLEX A(NPTS), U, K, T
0007        COMPLEX COMPLX, CONJG
0008        IF (INV.EQ.1) GO TO 100
0009        ENPTS=NPTS
0010        Recip=1./ENPTS
0011        DO 200 I = 1, NPTS
0012    200 A(I) = RECIP.CONJG(A(I))
0013    100 CONTINUE
0014        N = 2**M
0015        NV2 = N/2
0016        NM1 = N-1
0017        J = 1
0018        DO 7 I = 1, NM1
0019        IF (I.GE.J) GO TO 5
0020        T = A(J)
0021        A(J) = A(I)
0022        A(I) = T
0023    5   K =NV2
0024    6   IF (K.GE.J) GO TO 7
0025        J = J − K
0026        K = K/2
0027        GO TO 6
0028    7   J = J + K
0029        PI = 3.14159265358979
```

-continued

```
0030        DO 20 L = 1, N
0031        LE = 2**L
0032        LE1 = LE/2
0033        U = (1.0.0.)
0034        W = CMPLX(COS(PI/LE1),SIN(PI/LE1))
0035        DO 20 J = 1, LE1
0036        DO 10 I = J,N,LE
0037        IP = I + LE1
0038        T = A(IP)*U
0039        A(IP) = A(I) − T
0040    10  A(I) = A(I) + T
0041    20  O = O*W
0042        IF (INV. EO.1) GO TO 300
0043        DO 400 I = 1, NPTS
0044    400 A(I) = CONJG(A(I))
0045    300 CONTINUE
0046        RETURN
0047        END
```

As noted in the comments of the subroutine itself, INV is set to 1 for the subroutine to take the inverse transform of A(I). NPTS is the number of samples used to define $U(\omega)$ [A(I) of above program]. M is equal to the logarithm to the base 2 of NPTS.

The ROM 45 is preferably a commercially available programmable bipolar ROM with all bit values the same. The computer program $u(t)$ output samples (8 bit words in a specific example) are then stored by writing into the ROM the oppositely valued bits accordingly. These stored samplers are then read out sequentially by the clock signal applied.

Figure 7A:
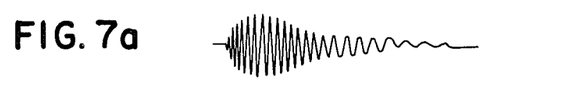
FIG. 7 illustrates several waveforms that exist in the circuit of FIG. 6.

Such a computer generation of the object illuminating function $u(t)$ with subsequent storage in a read only memory such as the ROM 45 of FIG. 6 is a technique of general application in carrying out the various aspects of the present invention. In the specific example of FIG. 6, the object 55 is placed in an air medium and the transmitting transducer 53 and a receiving transduver 57 are of similar broad band ultrasonic type. The parameters K and m of equation (6) were chosen in a specific implementation of the FIG. 6 example to be 2.06 and 8.0, respectively. The time varying function $u(t)$ with which the transducer 53 is driven is illustrated in FIG. 7(a). The object modified radiation received by the transducer 57 is converted into an electrical signal that is amplified by an amplifier 59 and applied to an analog multiplication circuit 61 at one input thereof. The output of the circuit 61 is applied to an integrator 63 with the level at the integrator output being applied to an oscilloscope or voltmeter read out device 65 for displaying the desired value of the Taylor series coefficients $f_0, f_1 \ldots f_N$.

A second input 67 of the multiplier 61 is effectively selectably connected to one of a line 69, an output of an analog differentiating circuit 71, an output of a circuit 73 for taking the second differential, an output of a circuit 75 for taking a third differential, an output of an analog circuit 77 for taking an integral, and an output of a circuit 79 for taking a double integral. The output in the line 49 of the ROM 45 is applied to these 6 signal paths one at a time by a switching circuit 81. The timing circuits 47 cause the first pulse $u(t)$ to be generated in the line 49 and its resultant ultrasonic energy pulse to be emitted by the transducer 53. Immediately after than, the pulse is repeated by the ROM 45 while the switch 81 is connected to the line 69. The timing of these two pulses is such that the second signal pulse reaches the multiplication circuit 61 at exactly the same time as the signal output of the amplifier 59 from the received object modified radiation of the first pulse reached the multiplier 61. In practice, this timing (that is, the time between the two pulses) can be adjusted to maximize the output of the reading device 65. This maximization sets the timing of the pulse repetition rate that is optimum for the particular range of the object 55. When the switch 81 is connected to the line 69, the output of the indicating device 65 is thus a signal that is proportional to the Taylor series coefficient $f_0$ of the transfer function of the object 55.

Figure 7B:
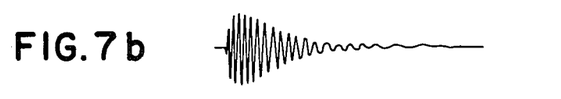

After that coefficient is determined, the switch 81 is moved to connect with the input of the differentiating circuit 71 and a pair of pulses with the same sequence is again emitted. The output of the differentiating circuit 71 which occurs during the second pulse output of this pulse pair from the ROM 45 is shown in FIG. 7(b). The differentiation of the $u(t)$ signal of FIG. 7(a) results in a time shrinking of the pulse. It is the pulse of FIG. 7(b) that is compared with the echo signal in the multiplier 61 and the integral of that product over a specified period of time appears at the indicating device 65 and is indicative of the Taylor series coefficient $f_1$.

Figure 7C:
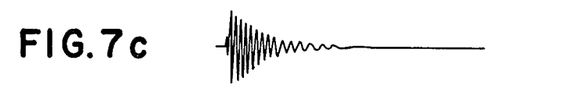

A pair of pulses as shown in FIG. 7(a) is again generated in the line 49, the switch 81 being connected during the second pulse of this pair to the input of the differentiating circuit 73. The output of that circuit is shown in FIG. 7(c) wherein it can be seen that the second differential is a pulse that is shrunk in time to a greater degree than the first differential as shown in FIG. 7(b). It is the waveform of FIG. 7(c) which is then multiplied against the echo return of the first pulse to obtain an indication at the display device 65 of the Taylor series coefficient $f_2$. The same process is carried out by connection with the differentiating circuit 75 for obtaining the coefficient $f_3$.

Figure 7D:
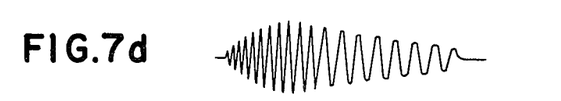
Figure 7E:
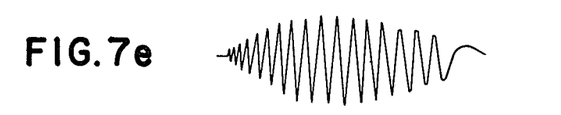

The Taylor series coefficient $f_{-1}$ is determined by the same pulse pair process, the switch 81 being connected to the integrating circuit 77 during the second pulse of the pair. The time stretched output of the integrator 77 during that second pulse is shown in FIG. 7(d). Similarly, a subsequent pair of pulses is generated in the line 49 with the switch 81 connected to the integrating circuit 79 during the second of these pulses, the output of that integrating circuit being shown in FIG. 7(e). The result is an individual determination of six coefficients of the Taylor series expansion of the transfer function of the object 55 as seen by ultrasonic energy in a frequency range extending about from 40 kHz. to 120 kHz. Additional coefficients could be obtained by adding higher order differential and integrating circuits if desired. A change in the shape of the object 55 or its orientation with respect to the illuminating radiation will change these coefficients, thus giving the desired information by only a few numbers. The correlator responses are preferably normalized; that is, divided by the correlator response when the reference signal is the transmitted signal.

The technique of FIG. 6 is a correlation one wherein reference signals of either the transmitted signal itself or time scaled versions thereof are compared with an electrical signal counterpart of the return echo received by the transducer 57. The reading in the output device 65 in determining each one of the coefficients is an indication of the common area under the envelopes of the simultaneous electronic pulses being applied to the multiplier 61. The differentiated (compressed) reference signals are being used to characterize, by certain of the $f_n$ Taylor series coefficients, the leading edge of an echo pulse which is related to initial curvature and "hardness" of the object material. Conversely, the integrated (stretched) reference signals characterize, by certain of the $f_{-n}$ coefficients, the trailing part of an echo pulse which is related to the extent (depth) of the object.

This correlation technique, because of the timing of the pulse pairs that are generated in establishing each of the coefficients, requires some knowledge of the range of the object 55. The matched filtering techniques described above with respect to FIGS. 4 and 5 do not require any range information or adjustment, however. Furthermore, one of the techniques of a receiver according to FIGS. 4 and 5 determine all of the desired coefficients with a single transmitted pulse by operating upon a single return echo. As described above, the correlation technique of FIG. 6 requires many pulses to be generated. On the other hand, the technique shown in FIG. 6 is somewhat easier to implement with hardware than the receiver technique shown in FIGS. 4 and 5. Otherwise, the matched filtering and correlation techniques operate on the same principle of comparing the return echo from an object with something based upon the transmitted pulse function. In the receiver embodiment of FIGS. 4 and 5, this comparison is accomplished by bandpass filters with bandpass characteristics related to the transmitted signal.

Figure 8:
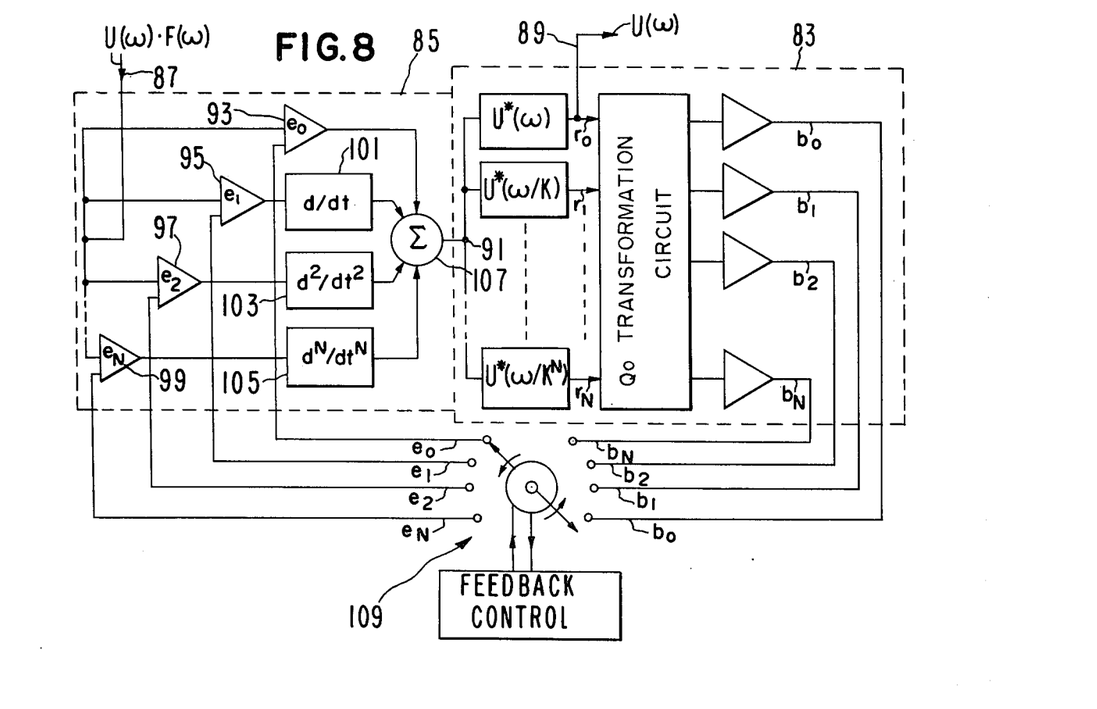
FIG. 8 illustrates in block diagram form an automatic system for compensating for undesirable transfer characteristics of a radiation path.

FIG. 8 shows a different application of the fundamental aspects of the present invention wherein a coefficient determining filter circuit 83, similar to that described above with respect to FIG. 4, utilizes its outputs $b_0$, $b_1$, $b_2$... $b_N$ to weight a compensating network 85. An input 87 to the filter 85 receives a signal, for example, from a telephone line having an undesirable transfer characteristic $F(\omega)$ that is desired to be eliminated by the compensating circuit 85. An output of the compensating circuit is provided at 89 at the output of the $U^*(\omega)$ bandpass filter. An input 91 to the filtering bank 83 is connected with the output of compensating circuit 85. This compensating circuit provides a transfer function of $F^*(\omega)$, thereby eliminating the undesirable transfer function $F(\omega)$ of the telephone line or other electronic circuit which is being compensated.

The compensating circuit 85 includes a plurality of parallel paths each having a variable gain amplifier, such as the amplifiers 93, 95, 97 and 99. A differentiating circuit 101 receives the output of the amplifier 95, a second order differentiating circuit 103 receives the output of the amplifier 97 and a differentiating circuit 105 of the Nth order is in series with the amplifier 99. Each of these amplifiers receives the input signal in the line 87 and its gain is controlled by voltages $e_0$, $e_1$, $e_2$... $e_N$. Thus, a summation circuit 107 receives as individual inputs the gain adjusted components of the signal applied to the input 87, these components being one without differentiation, the first order differential, the second order differential and the Nth order differential of the input signal. Integrating circuits can also be added if desired in additional parallel legs of the compensating circuit 85.

The outputs $b_0$, $b_1$, $b_2$... $b_N$ of the filter 83 correspond to the outputs $f_0$, $f_1$... $f_N$ described above with respect to FIG. 4. The outputs $b_0$, $b_1$, $b_2$... $b_N$ are periodically connected by a feedback switching circuit 109 to the amplifier gain control lines $e_0$, $e_1$, $e_2$... $e_N$. The desired output conditions of the filter 83 is for the normalized output $b_0$ to equal unity and the other outputs to be equal to zero. The feedback loop from the output of the filter 83 to controlling the gains of the amplifiers of the compensating network 85 maintain this condition.

In the application of the automatic compensating network of FIG. 8, a function U(ω) is transmitted through a communication circuit (not shown in FIG. 8) and into the input 87 of FIG. 8. The outputs will appear at $b_0, b_1, b_2 \ldots b_N$ according to the function F(ω) and the transfer function of compensation network 85. The gains of the amplifiers of the compensating network 85 will be changed to drive $b_0$ to 1 and the other outputs $b_0, b_2 \ldots b_N$ of the filter 83 to zero. Between these periodic transmissions and adjustments by the pulse U(ω), the communication circuit is serving its normal function of transmitting data through the filter 85 between its input line 87 and output line 89.

Figure 9:
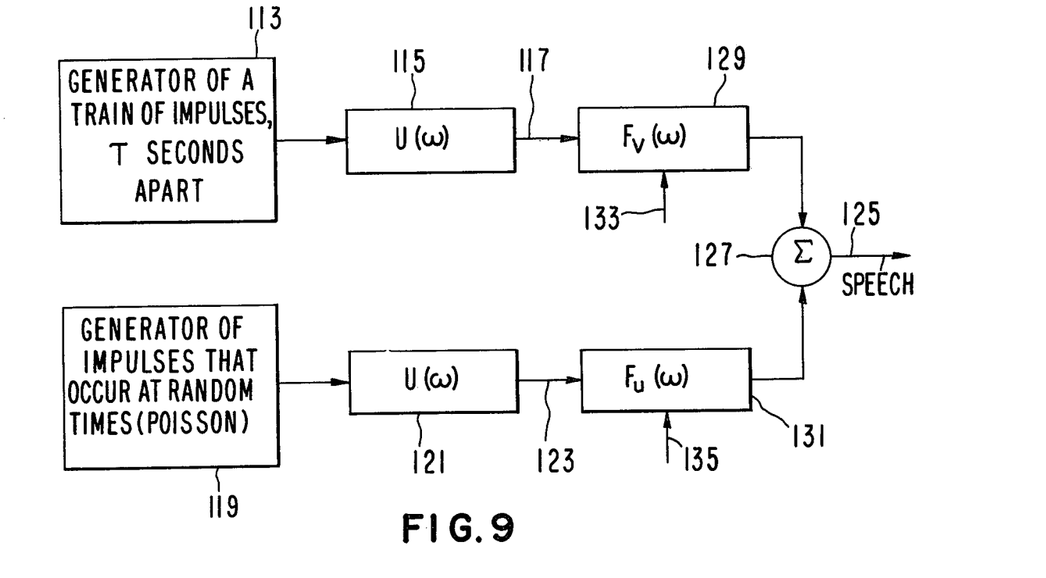
FIG. 9 illustrates generally the application of the general techniques of the present invention to speech synthesis.

The broad techniques of the present invention can also be applied to parameterized speech; that is, to take human speech and characterize it by the Taylor series constants. Referring to FIG. 9, a model for speech synthesis is presented. There are two paths, one for unvoiced (consonants) components of speech and the other for voice (vowels) components of speech. This breakdown has been recognized generally by others. A generator 113 of periodically recurring pulses is passed through a filter 115 of an output 117 that is a U(ω) type of signal. This is the voice path wherein the vocal cords control the sounds that are made. The unvoiced path includes a generator 119 of randomly occurring pulses which pass through a filter 121 having an output 123 of a U(ω) type of pulse at the occurence of each of the pulses at the output of the generator 119. The unvoiced components of human speech are formed by air turbulence and is a type of noise rather than carefully formed sounds with the use of vocal cords. It is the recognition of this invention that composite speech at an output 125 of a summation circuit 127 is merely successive U(ω) type of pulses which are formed into audible sounds by passing through filters 129 and 131 in the voiced and unvoiced legs, respectively. The filters 129 and 131 are the same type as the filter 85 discussed above with respect to FIG. 8 and have control inputs 133 and 135 which sets the amplifier gains $e_0, e_1, e_2 \ldots e_N$ of the filter 85 in a manner to form audible sounds out of the U(ω) type of pulse. This means that speech itself can be characterized by the Taylor series coefficients which are related to the amplifier gains of the filters 129 and 131. These coefficients may then be transmitted from one point to another rather than the complex speech signal at the output line 125.

Figure 10A:
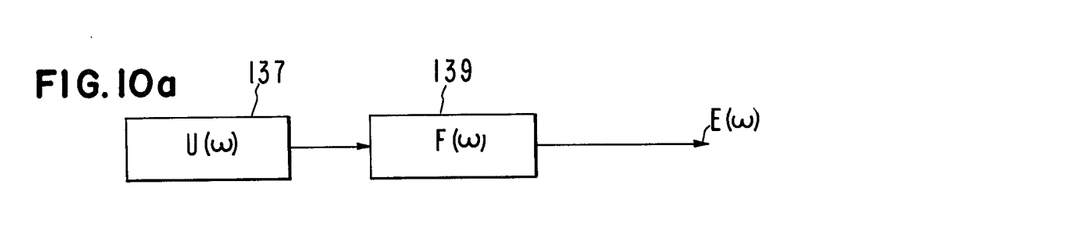
FIG. 10 presents mathematical flow charts of several applications of the techniques of the present invention.

Referring to FIG. 10, certain of the aspects of the present invention as described above with respect to specific examples are summarized. FIG. 10(a) shows a generator 137 of a U(ω) type of signal as discussed above that is directed through a linear filter 139 having a transfer characteristic of F(ω) to give an output E(ω). FIG. 10(a) is a mathematical model of the sonar and radar system described with respect to FIG. 1. It will also be noted as similar to each of the paths of the speech synthesizing techniques of FIG. 9 wherein the transfer function F(ω) is variable by addition of an electronic control signal.

Figure 10B:
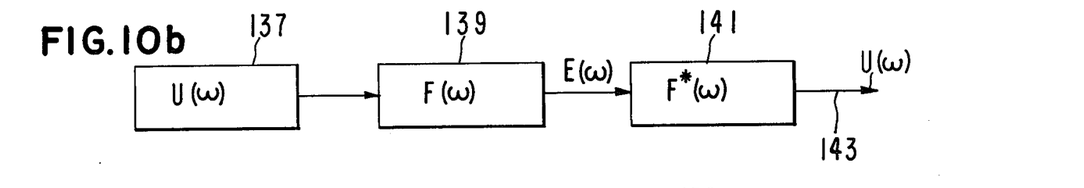

FIG. 10(b) shows a similar system but where a filter F*(ω) 141 is applied in series after the filter 139 to compensate for its transfer characteristic so that an output at 143 is the same siganl as was inputted to the filter 139. This is a generalized mathematical model of the FIG. 8 system wherein the compensating filter 141 corresponds to the filter 85 of FIG. 8. This also shows how even in the sonar and radar example of FIG. 1 that the effect of the object upon the incident radiation may be eliminated by an electronic filter having a transfer function that is a conjugate of the transfer function of the object itself.

Figure 10C:
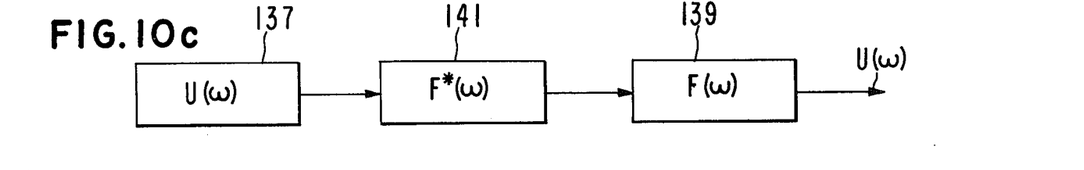

FIG. 10(c) similar to FIG. 10(b) except that the filters 139 and 141 have been reversed in their serial sequence. The filter 139 could be, for instance, the characteristics of a communications circuit such as a telephone line while its compensation is placed in the form of a filter 141 ahead of the communication circuit for eliminating its effect upon information being transmitted therethrough.

Although the various aspects of the present invention have been described with respect to the preferred embodiment thereof, it will be understood that the invention is entitled to protection within the full scope of the appended claims.

I claim:

1. A method of determining characteristics of a radiation path comprising the steps of:
   transmitting a radiation signal through said radiation path, thereby modifying said radiation according to the characteristics of said path, said transmitted radiation signal comprising a chirped burst of energy with a known frequency domain distribution such that when multiplied by the frequency raised to an integer power the new frequency domain distribution is a scaled version of the transmitted signal and decorrelated therefrom, and
   comparing characteristics of the transmitted radiation signal and the modified radiation signal in a manner to determine Taylor series coefficients of a transfer function of said radiation path, whereby said coefficients are characteristic of a transfer function of said radiation path.

2. A method according to claim 1 wherein said radiation path includes a physical object, whereby the characteristics of the object can be determined from the transfer function coefficients of said radiation path.

3. A method according to claim 1 wherein said radiation path includes an electronic circuit, whereby the quality of said circuit for carrying undistorted information is measured by said transfer function coefficients of said radiation path.

4. A method according to claim 1 which comprises the additional step of passing the radiation through an adaptive filter that sets itself to have a transfer function that is substantially an inverse of said radiation path transfer function, whereby said radiation path transfer function is compensated.

5. A method according to claim 1 wherein the step of comparing includes the steps of correlating with the object modified radiation signal a plurality of radiation signals selected from the group of the transmitted radiation, the first derivative of the transmitted radiation, the second derivative of the transmitted radiation, the third derivative of the transmitted radiation, the first integral of the transmitted radiation and the second integral of the transmitted radiation; whereby each such correlation gives a desired series coefficient.

6. A method according to claim 1 wherein the comparing step includes the step of passing the modified radiation signal through an electronic filter having a transfer characteristic that is substantially the conjugate of the spectrum of said transmitted radiation signal.

7. A method according to claim 6 wherein the comparing step additionally includes passing said modified radiation signal through additional electronic filters, each of said additional electronic filters having an unique transfer characteristic that is substantially the conjugate of the transmitted radiation signal spectrum when multiplied by the frequence raised to a distinct integer power, whereby the amount of energy of the modified radiation signal that passes through each of said plurality of filters if proportional to a Taylor series constant.

8. A method according to claim 1 wherein the step of transmitting the radiation signal comprises transmitting compressional wave energy toward a physical object, said compressional wave energy being within the ultrasonic frequency range.

9. A method according to claim 1 wherein the comparison step comprises comparing characteristics of the transmittal radiation and the modified radiation signal only at an instant that the modified radiation signal is substantially a maximum.

* * * * *